United States Patent [19]

Meyer

[11] Patent Number: 4,664,917
[45] Date of Patent: * May 12, 1987

[54] METHOD OF PROVIDING CATTLE WITH PROTEINACEOUS FEED MATERIALS

[75] Inventor: Edwin W. Meyer, Chicago, Ill.

[73] Assignee: Central Soya Company, Inc., Fort Wayne, Ind.

[*] Notice: The portion of the term of this patent subsequent to May 12, 2004 has been disclaimed.

[21] Appl. No.: 670,532

[22] Filed: Nov. 13, 1984

[51] Int. Cl.$^4$ ............................................... A23K 1/00
[52] U.S. Cl. ......................................... 426/2; 426/74; 426/630; 426/646; 426/807
[58] Field of Search ................... 426/74, 2, 104, 623, 426/630, 656, 807

[56] References Cited

U.S. PATENT DOCUMENTS

| | | |
|---|---|---|
| 2,295,643 | 9/1942 | Emery . |
| 3,463,858 | 8/1969 | Anderson . |
| 3,941,818 | 3/1976 | Abdel-Monem . |
| 4,021,569 | 4/1977 | Abel-Monem . |
| 4,172,072 | 10/1979 | Ashmead . |
| 4,186,213 | 1/1980 | Burroughs et al. . |
| 4,251,550 | 2/1981 | Proctor .................................. 426/74 |

FOREIGN PATENT DOCUMENTS

| | | |
|---|---|---|
| 2704746 | 2/1977 | Fed. Rep. of Germany . |
| 0891055 | 12/1981 | U.S.S.R. ................................ 426/74 |

OTHER PUBLICATIONS

Britton et al., (1978), J. Anim. Sci. 46: 1738–1747.
Lantzch et al., (1979), Uebers, Tierernaehr 7(2): 185–188 (German original and English translation).
Lease and Williams (1967), Poultry Science, 46: 233–241.
Tagari et al., (1962), Brit. J. Nutr., 16: 237–243.
Schugel, "The Rule of Zinc Methionine," etc., Zinpro Corporation Technical Bulletin (Undated).
Zinpro Corporation Technical Bulletins for "Zinpro 40, Zinpro 100, and Zinpro 200" (Undated).
Miller et al., (1965) J. Dairy Sci., 48: 450–453.
Chalmers et al., (1954) J. Agr. Sci., 44: 254–262.
"Mineral Tolerance of Domestic Animals" (1980, National Academy of Sciences) Zinc, pp. 553–577.
Ott et al., J. Anim. Sci. (1966) 25: 414–438 (Related series of four papers).

*Primary Examiner*—R. B. Penland
*Attorney, Agent, or Firm*—Allegretti, Newitt, Witcoff & McAndrews, Ltd.

[57] ABSTRACT

Dry mixes of zinc salts with particulate proteinaceous feeds for ruminants decrease the rumen digestibility of the protein thereby increasing the nutrient value of the feed to the ruminant. The zinc salts are incorporated as powders external to the particles of feed material. The protective action against micro-organism attack on the protein is provided in the rumen. The dry mix feed materials can be used with beef and dairy cattle and sheep.

7 Claims, No Drawings

METHOD OF PROVIDING CATTLE WITH PROTEINACEOUS FEED MATERIALS

BACKGROUND AND PRIOR ART

The field of this invention relates to improving the nutritive value of soybean meal and other proteinaceous feeds for ruminants. More particularly, the invention is concerned with methods of protecting the protein of the feeds from rumen digestion, and with the nutritionally improved feeds resulting from such rumen-protection.

It has been recognized for some time that protein-providing feed materials which are subject to digestion in the rumen are thereby, in effect, downgraded with respect to the feeding value of the protein. It has been proposed that ideally the protein component of the ruminant feed should be "protected" against being solubilized or metabolized in the rumen, passing therethrough in substantially undegraded form, while remaining digestable and metabolizable in the post-rumen digestive system of the cattle or sheep. The development of a practical way for applying this concept to ruminant nutrition has proven difficult. U.S. Pat. No. 3,619,200 proposes the application to the vegetable meal or other proteinaceous ruminant feed material of a rumen resistant coating. The purpose of the coating is to protect the proteinaceous feed from microbial attack in the rumen while decomposing and permitting digestion of the feed within the abomasum and small intestine.

It is also known that the solubility of protein in ruminant feed materials can be reduced by treating the feed materials with tannin, formaldehyde, or other aldehydes. In addition, a reduction in protein solubility can be obtained by heating the protein. These procedures are summarized with literature refrences thereto in U.S. Pat. No. 4,186,213. Feed materials which may be treated by one or more of these procedures to reduce the solubility of the protein in the rumen and to protect against rumen destruction are disclosed as including various vegetable meals.

With reference to feeding value lost by rumen destruction, soybean meal has a relatively low protein efficiency value. See Klopfenstein, *Feedstuffs*, July, 1981, 23-24. Since soybean meal is one of the major protein-containing feed materials used with ruminants, it is particularly desirable to provide a commercially practical means for protecting soybean meal against rumen destruction while leaving the protein thereof subject to post-rumen digestion and metabolism. For large scale commercial use such a method must be simple, efficient, and of relatively low cost.

I have previously shown that the rumen digestibility of proteinaceous defatted vegetable meals can be reduced by impregnating the feed material with an aqueous solution of a zinc salt, such as zinc chloride or sulfate. (See my published European Patent Application No. 0 107 049.) The impregnated protein material is subjected to moist heat to react the zinc ions with the protein. For example, from 0.25 to 1.3% by weight of zinc (Zn) based on the dry weight of the meal may be incorporated in the vegetable proteinaceous material in the manner described.

SUMMARY OF INVENTION

In my prior experimental work with zinc salts for rumen protection of vegetable protein, it was presumed to be essential to contact the vegetable protein with zinc ions under conditions (viz. moist heat) which would cause the zinc ions to complex or otherwise associate with the protein. The zinc salt was therefore applied in the form of an aqueous solution, and after absorption of the solution by the vegetable protein material, it was subjected to moist heat to promote the reaction. I have subsequently discovered that effective rumen protection can also be provided by merely mixing a sufficient amount of a zinc salt powder such as zinc chloride or zinc sulfate with the dry particulate proteinaceous feed material. In the resulting mixture, the zinc salt is present as a dry powder external to the particles of proteinaceous material. It is not absorbed by or prereacted with the protein. Nevertheless, effective rumen protection of the protein is obtained. This result is highly unexpected. Furthermore, it has been found that this method of protection is not limited to vegetable meals, and that it is generally applicable to all proteinaceous feed ingredients, including animal and microbiological protein sources as well as vegetable meals.

The discovery underlying the present invention makes it practical to protect proteinaceous feed materials without using additional processing steps. Very little added cost is involved, since it is common practice to prepare proteinaceous feed concentrates and/or complete feeds in the form of dry mixes. The mixing and blending of the particulate ingredients is carried out in standard blending apparatus. Certain of the ingredients may be first prepared as a premix which is then incorporated in the feed concentrate or complete feed by a dry mixing procedure. The mixing is at least sufficient to produce a substantially uniform admixture. Given this existing commercial practice, it is a simple matter at an appropriate time to mix in the zinc salt powder so that it becomes substantially uniformly distributed throughout the feed concentrate or complete feed. Further the zinc salt may be added separately or as part of a premix. The rumen protective action is provided even though the zinc salt is in the form of a dry powder which remains external to the particles of proteinaceous feed material.

DETAILED DESCRIPTION

The method of this invention may be practiced with any proteinaceous ruminant feed composition. Such compositions as principal ingredients may contain a defatted vegetable seed meal, or related feed material, such as brewer's grains or distillers grains which are by-products of fermentation of barley, corn, and other seed grains. Proteinaceous meals of animal or microbiological origin can also be used. The materials of vegetable origin include wheat middlings and vegetable oil seed meals such as soybean meal, cottonseed meal, peanut meal, sunflower meal, Canola meal (low glucosinolate rapeseed), etc. Other related proteinaceous feed components include animal by-product materials such as fish meal, meat-bone meal, as well as single cell protein materials such as yeast cells or bacterial cells resulting from fermentation processes. The term "single cell protein" refers to dried deactivated micro-organisms used as animal feedstuffs. A particularly advantageous embodiment of this invention uses defatted soybean meal as part or all of the protein component. The soybean meal may be either in the form of untoasted white flakes or toasted meal, but toasted meal is preferred.

The zinc salt powder is preferably zinc sulfate, but other ruminant-edible water-soluble zinc salts can be used, such as zinc chloride, zinc acetate, etc. Such zinc salts are available commercially in the form of dry free-flowing powders. The zinc salts may be anhydrous, or they may contain water of hydration. Specific examples are zinc sulfate monohydrate, zinc sulfate hexahydrate, zinc acetate dihydrate, anhydrous zinc chloride, etc.

To provide the benefits of the present invention at least from 0.005 to 0.0294 parts by weight of zinc (Zn basis) should be incorporated in the ruminant feed composition per part of protein. While larger amounts of zinc may be used, they are not required for effective protection of the protein against rumen digestion. Further it is desirable to avoid large excesses of salts. The zinc salt should not be used in amounts which are toxic to ruminants, or which produce toxic residues in carcasses of meat-producing ruminants or in the milk of milk-producing ruminants. As a specific example, for anhydrous zinc chloride from 0.5 to 3% by weight (based on total protein) can be used. Equivalent amounts of zinc in other zinc salts can be substituted. A particularly desirable level for the zinc in the form of the zinc salt powder is from 0.01 to 0.02 parts by weight of zinc per part of protein, such as, for example, about 0.015 to 0.016 parts of zinc per part of protein. The amount of protein present may be calculated on the basis of a nitrogen determination, the weight of the nitrogen being multiplied by the standard conversion factor of 6.25 to provide a weight estimate of protein.

Ruminant feed compositions of the kind with which the present invention is particularly useful are in the form of dry mixtures of finely-divided particles which include proteinaceous feedstuffs, usually referred to as "meals", of the kind described above. The feed mixtures may be the kinds referred to in the feed industry as "feed concentrates" or "complete feeds". A feed concentrate is an ingredient mixture containing essential vitamins, minerals, both micro and macro, any appropriate medication, and the high-protein feed components. Protein content may range from about 28 percent to about 42 percent (Nitrogen×6.25). Commonly, many concentrates contain around 38 percent protein. The most common protein-providing ingredients are soybean meal, cottonseed meal, rapeseed and Canola meals, meat and bone meal, wheat middlings, and the like. Often a mixture of more than one protein source is included.

Concentrates, either pelleted or as a mash, can be used to make complete feeds by adding available grains and other energy sources. Complete feeds are compounded mixtures containing all the nutrients of concentrates plus various energy sources such as grains, some fat, and the like. In addition, certain major minerals may be added. The total ingredient mixture is often referred to as a mash. The mash can be fed directly without further processing (viz. unpelleted).

For the feeding of ruminants, complete feeds are usually fed together with roughages, such as forage crops, hay, alfalfa, haylage, corn silage, and the like. Dairy feeds may vary from about 12 percent to about 24 percent protein. Dairy feeds at about 16 percent protein are common. Beef animal concentrates contain about 32 to 40 percent protein, whereas the complete feed or mash is usually about 12 percent protein.

For convenience of handling and incorporation in the feed concentrate or a complete feed, the zinc salt powder may be combined with standard premixes. A premix is a product containing vitamins, minerals, and appropriate medications. Such premixes may include a carrier to increase bulk, and, hence, improve distribution in preparing a more complete feed material. These carriers may include soy mill run, rice bran, and similar edible plant by-products. Such premixes are used to formulate ruminant feed concentrates and complete feeds.

Standard mixing and blending equipment may be employed for practicing the present invention. No special or additional steps are required. In one procedure, the zinc salt powder is first mixed with the proteinaceous components, and the other components are subsequently added, such as a vitamin-containing premix, etc. However, no particular order of addition or mixing sequence is required to achieve the benefits of this invention. It is desirable to provide sufficient mixing to achieve a substantially uniform distribution of the zinc salt throughout the dry mix, but this is also the desirable requirement for all components of the feed mix. The resulting mix will contain the zinc salt in the form of particles external to the particles of proteinaceous feed material. The completed dry mix may be fed as such to achieve the desired rumen protection of the proteinaceous feedstuffs.

The principal uses of the ruminant feeds produced in accordance with the present invention are for the feeding of beef and dairy cattle. The presence of the zinc salt in the rumen, although not previously reacted with the protein, protects the protein against rumen digestion, thereby assuring that more of the protein reaches the lower gut for direct nourishment of the animal rather than providing nutrient for the micro-organisms of the rumen. The zinc salt containing ruminant feeds thereby produce faster growth rates in young beef animals when compared with untreated feeds at equal protein content. Alternatively, the protein content in the zinc salt containing feeds can be reduced while still obtaining comparable growth rates, thereby reducing feed costs. Use of the zinc salt-containing dry mixes with dairy cattle for milk production follows a similar pattern.

In one presently preferred embodiment, zinc sulfate monohydrate powder is admixed with defatted toasted soybean meal. Taking soybean meal of 48 percent protein (N×6.25) as the standard, the optimum amount of the zinc sulfate monohydrate to be added is calculated as weight of protein times 0.042. For other zinc salts or vegetable meals, an equivalent zinc and protein basis is used.

The experimental basis of the present invention is shown by the following examples. In these examples, a standard enzyme indigestibility test was employed to evaluate the degree of rumen protection provided by the zinc salt. The ADIN (acid detergent insoluble nitrogen) was determined by the method described by Goering et al., "Analytical Measures of Heat-Damaged Forage and Nitrogen Digestibility", Annual Meeting of the ADSA, Gainesville, Fla., June, 1970. See also *Forage and Fiber Analyses, Agricultural Handbook No. 379*, p. 11, ARS, USDA, Jacket No. 387–598. ADIN is a measure of the amount of nitrogen (protein) in a feedstuff which is unavailable to the animal for nourishment.

More specifically, in the following examples, the values for enzyme indigestible nitrogen (protein) were calculated and presented as follows:

% RN = % Undegraded N in the Sample

% AUN = % Of original N which is available and $$\text{undegraded} = \frac{\% RN - \% ADIN}{\% N \text{ in original sample}} \times 100$$

Average % AUN = Average of ½, 1, and 2 hours AUN's

% AUN increase =

$$\frac{\text{Avg. } \% AUN - \text{Av. } \% AUN \text{ untreated control}}{\text{Avg. } \% AUN \text{ untreated control}} \times 100$$

In certain examples, only the two hour values of AUN (available undegraded nitrogen) are shown. Both methods of calculation are useful indicators of the magnitude of the protein bypass potential in feeding a ruminant animal.

EXAMPLE I

As a demonstration of the dry mixing procedure, toasted soybean meal was mixed with several levels of zinc chloride and zinc sulfate monohydrate. For this purpose a single lot of commercial soybean meal (defatted and toasted) containing 51.9 percent protein (N×6.25) was used. A portion of the soybean meal was retained as a control. The remainder was treated with zinc salts in four separate preparations.

In the first preparation, 2400 pounds of meal was mixed with 37.4 pounds (1.56% by weight) of anhydrous zinc chloride in a vertical twin screw mixer for ten minutes. In a similar fashion, 2200 pound lots were mixed with: (a) 45.8 lbs. (2.08% by weight) of anhydrous zinc chloride, (b) 45.3 lbs. (2.06% by weight of zinc sulfate monohydrate, and (c) 60.5 lbs. (2.75 by weight) of zinc sulfate monohydrate. Representative samples of the treated meals and the control were evaluated by the enzyme assay for bypass potential. The results are presented in Table A.

TABLE A

| Product | Zinc Salt | Weight Percent Added | Avg. % AUN | % AUN Increase |
|---|---|---|---|---|
| Soybean Meal | None | — | 21.3 | — |
| Soybean Meal | ZnCl$_2$ | 1.56 | 35.4 | 66.2 |
| Soybean Meal | ZnCl$_2$ | 2.08 | 44.8 | 110.3 |
| Soybean Meal | ZnSO$_4$.H$_2$O | 2.06 | 40.8 | 91.4 |
| Soybean Meal | ZnSO$_4$.H$_2$O | 2.75 | 42.0 | 97.0 |

EXAMPLE II

In an experiment demonstrating the efficacy of dry mixing with zinc salts for augmenting protein bypass for ruminants, standard wheat middlings, often referred to as wheat midds, containing 16.4 percent protein (N×6.25) and toasted soybean meal containing 50.6 percent protein were treated with zinc sulfate monohydrate (ZnSO$_4$.H$_2$O) and evaluated. Three hundred pounds of wheat midds were mixed with 2 pounds of ZnSO$_4$.H$_2$O in a vertical twin screw mixer for five minutes. Samples of the prepared wheat midds product were taken for use in this experiment. Sixty-four pounds of toasted soybean meal was mixed in a small ribbon blender with 1.3 pounds of ZnSO$_4$.H$_2$O for 10 minutes. Samples of the prepared soybean meal product were taken for use in this experiment. The treated samples together with untreated control samples of the same wheat midds and soybean meal were evaluated for potential bypass properties by the enzyme degradation assay described earlier. The results are summarized in Table B.

TABLE B

| Product | Treatment | Avg. % AUN | % AUN Increase |
|---|---|---|---|
| Wheat midds. | None | 27.1 | — |
| Wheat midds. | ZnSO$_4$ | 36.0 | 32.8 |
| Soybean meal | None | 16.3 | — |
| Soybean meal | ZnSO$_4$ | 31.0 | 90.2 |

EXAMPLE III

Three dairy feeds were prepared to evaluate the effect of dry mixing on the impact of zinc salts for protein rumen bypass. A dairy feed made with an aqueous solution of zinc chloride was included in this trial for comparison. The formulations used are presented in Table C.

TABLE C

| Ingredient/Trial | 1 | 2 | 3 | 4 |
|---|---|---|---|---|
| Ground corn | 227.35 lb. | 224.85 | 223.35 | 224.05 |
| Wheat middlings | 150.00 | 150.00 | 150.00 | 150.00 |
| Soybean meal | 74.00 | 74.00 | 74.00 | 74.00 |
| Limestone | 1.20 | 1.20 | 1.20 | 1.20 |
| Defluorinated phosphate | 2.60 | 2.60 | 2.60 | 2.60 |
| Sodium bicarbonate | 7.50 | 7.50 | 7.50 | 7.50 |
| Yellow grease | 2.10 | 2.10 | 2.10 | 2.10 |
| Molasses | 30.00 | 30.00 | 30.00 | 30.00 |
| Sulfate Salts[a] | 4.25 | 4.25 | 4.25 | 4.25 |
| Vitamin premix | 0.25 | 0.25 | 0.25 | 0.25 |
| Ruminant trace minerals | 0.50 | 0.50 | 0.50 | 0.50 |
| Flavor | 0.25 | 0.25 | 0.25 | 0.25 |
| Zinc chloride anhydrous | — | 2.50 | — | — |
| Zinc chloride solution[b] | — | — | 4.00 | — |
| Zinc sulfate monohydrate | — | — | — | 3.30 |
| | 500.00 lb. | 500.00 | 500.00 | 500.00 |

[a]Mixture of magnesium and potassium sulfates: 22% sulfur, 11% magnesium, and 18% potassium.
[b]Concentrated aqueous solution containing 2.50 lbs. of zinc chloride per 4.00 lbs. of solution.

The test feeds were prepared as follows:
1. The ingredients were weighted into a weigh buggy in the following order:
   a. The major ingredients (corn, midds, soybean meal) were added first.
   b. The minerals (limestone defluorinated phosphate, sodium bicarbonate, sulfate salts, and trace minerals), vitamins, and flavor were added next.
   c. The zinc salt was added last.
2. The contents of the weigh buggy were dumped into a Prater mixer (twin screw).
3. The fat and molasses were added after the mixing started.
4. The feed components were mixed for 20 minutes.
5. Samples of the dry treated feeds were taken at 5, 10, and 20 minutes while mixing was in progress.
6. The untreated control feed was sampled at the same intervals and composited for evaluation.
7. The feed treated with the aqueous zinc chloride solution was sampled at 5 and 10 minutes only.

The feeds prepared in this study were evaluated by the enzyme degradability test. For this study only the two hour enzyme assay data were used in calculating the average percent AUN. In other respects there was no difference in assay procedure or treatment of results. The findings are listed in Table D.

TABLE D

| Test | Formulation | Treatment | Mix Time | Avg. % of AUN | % of AUN Increase |
|---|---|---|---|---|---|
| 1 | 1 | None | 20 min. | 19.5 | — |
| 2 | 2 | ZnCl$_2$ | 5 min. | 34.1 | 74.9 |
| 3 | 2 | ZnCl$_2$ | 10 min. | 38.6 | 97.9 |
| 4 | 2 | ZnCl$_2$ | 20 min. | 35.6 | 82.6 |
| 5 | 3 | ZnCl$_2$ Soln. | 5 min. | 36.8 | 88.7 |
| 6 | 3 | ZnCl$_2$ Soln. | 10 min. | 35.6 | 82.6 |
| 7 | 4 | ZnSO$_4$.H$_2$O | 5 min. | 31.7 | 62.6 |
| 8 | 4 | ZnSO$_4$.H$_2$O | 10 min. | 33.8 | 73.3 |
| 9 | 4 | ZnSO$_4$.H$_2$O | 20 min. | 34.7 | 77.9 |

EXAMPLE IV

A study was made to determine the impact of dry mixing zinc sulfate monohydrate with various protein-containing feed ingredients on the potential of the protein for rumen bypass properties. The products included ground corn, dehydrated alfalfa, wheat middlings, sunflower meal, soybean meal, soy mill run, rice mill byproduct, and Canola meal (a Canadian variety of rapeseed meal low in erucic glycerides and glucosinilates). Two thousand gram quantities of each product were separately mixed in an orbital mixing bowl with zinc sulfate monohydrate added as based on the protein content (N×6.25) of the proteinaceous product. After mixing for about 10–15 minutes, one 2000 g. quantity of each treated product was further mixed with 10 g. of yellow grease (see Table E). The fat was added since this can be useful in maintaining zinc salt dispersion.

TABLE E

| Sample No. | Ingredient | Weight Ingred. | Wt. Zinc Sulfate | Wt. Added Fat | Theo. Zn Content (% as is) |
|---|---|---|---|---|---|
| 1 | Ground corn | 2000 grams | 0* | 0 | 0 |
| 2 | Ground corn | 2000 grams | 7 grams | 0 | 0.1254 |
| 3 | Ground corn | 2000 grams | 7 grams | 10 grams | 0.1248 |
| 4 | Dehy. alfalfa | 2000 grams | 0 | 0 | 0 |
| 5 | Dehy. alfalfa | 2000 grams | 14 grams | 0 | 0.2500 |
| 6 | Dehy. alfalfa | 2000 grams | 14 grams | 10 grams | 0.2487 |
| 7 | Wheat midds | 2000 grams | 0 | 0 | 0 |
| 8 | Wheat midds | 2000 grams | 14 grams | 0 | 0.2500 |
| 9 | Wheat midds | 2000 grams | 14 grams | 10 grams | 0.2487 |
| 10 | Sunflower meal | 2000 grams | 0 | 0 | 0 |
| 11 | Sunflower meal | 2000 grams | 23 grams | 0 | 0.4088 |
| 12 | Sunflower meal | 2000 grams | 23 grams | 10 grams | 0.4068 |
| 13 | Soybean meal | 2000 grams | 0 | 0 | 0 |
| 14 | Soybean meal | 2000 grams | 41 grams | 0 | 0.7224 |
| 15 | Soybean meal | 2000 grams | 41 grams | 10 grams | 0.7189 |
| 16 | Soy mill run | 2000 grams | 0 | 0 | 0 |
| 17 | Soy mill run | 2000 grams | 13 grams | 0 | 0.2322 |
| 18 | Soy mill run | 2000 grams | 13 grams | 10 grams | 0.2311 |
| 19 | Rice mill byproduct | 2000 grams | 0 | 0 | 0 |
| 20 | Rice mill byproduct | 2000 grams | 5 grams | 0 | 0.0897 |
| 21 | Rice mill byproduct | 2000 grams | 5 grams | 10 grams | 0.0892 |
| 22 | Canola meal | 2000 grams | 0 | 0 | 0 |
| 23 | Canola meal | 2000 grams | 31 grams | 0 | 0.5489 |
| 24 | Canola meal | 2000 grams | 31 grams | 10 grams | 0.5462 |

*"0" indicates a negligible value of less than 0.01 grams.

These products were evaluated by the enzyme assay previously described for potential protein bypass in the rumen. The results are shown in Table F.

TABLE F

| Sample No. | Ingredient | Treatment | Avg. % AUN | % AUN Increase | % Protein N × 6.25 |
|---|---|---|---|---|---|
| 1 | Ground corn | None | 42.9 | — | 8.8 |
| 2 | Ground corn | ZnSO$_4$ | 54.7 | 27.5 | — |
| 3 | Ground corn | ZnSO$_4$—Fat | 56.0 | 30.6 | — |
| 4 | Dehy. alfalfa | None | 17.4 | — | 17.4 |
| 5 | Dehy. alfalfa | ZnSO$_4$ | 29.4 | 69.0 | — |
| 6 | Dehy. alfalfa | ZnSO$_4$—Fat | 28.4 | 63.8 | — |
| 7 | Wheat midds | None | 24.0 | — | 16.9 |
| 8 | Wheat midds | ZnSO$_4$ | 32.0 | 33.3 | — |
| 9 | Wheat midds | ZnSO$_4$—Fat | 31.0 | 29.2 | — |
| 10 | Sunflower meal | None | 12.0 | — | 27.9 |
| 11 | Sunflower meal | ZnSO$_4$ | 26.4 | 119.8 | — |
| 12 | Sunflower meal | ZnSO$_4$—Fat | 27.0 | 124.8 | — |
| 13 | Soybean meal | None | 23.9 | — | 48.5 |
| 14 | Soybean meal | ZnSO$_4$ | 32.0 | 33.9 | — |
| 15 | Soybean meal | ZnSO$_4$—Fat | 35.6 | 49.0 | — |
| 16 | Soy mill run | None | 41.1 | — | 10.9 |
| 17 | Soy mill run | ZnSO$_4$ | 54.2 | 31.7 | — |
| 18 | Soy mill run | ZnSO$_4$—Fat | 51.3 | 24.7 | — |
| 19 | Rice mill byproduct | None | 43.2 | — | 6.3 |
| 20 | Rice mill byproduct | ZnSO$_4$ | 45.7 | 5.8 | — |
| 21 | Rice mill byproduct | ZnSO$_4$—Fat | 45.9 | 6.3 | — |
| 22 | Canola meal | None | 18.9 | — | 37.3 |
| 23 | Canola meal | ZnSO$_4$ | 36.8 | 94.7 | — |
| 24 | Canola meal | ZnSO$_4$—Fat | 35.8 | 89.4 | — |

I claim:

1. The method of providing cattle with proteinaceous feed materials to increase meat or milk production in relation to protein intake, comprising dry blending particulate proteinaceous cattle feed material with a ruminant-edible water-soluble zinc salt in the form of a dry powder to form an admixture in which the particles of proteinaceous feed material are unreacted with said zinc salt powder, from 0.005 to 0.0294 parts by weight of zinc being incorporated in said admixture per part of protein, and feeding said admixture without pelleting thereof to beef cattle for meat production or dairy cattle for milk production, said zinc salt remaining unreacted with the protein of said feed material prior to said feeding.

2. The method of claim 1 in which said proteinaceous feed material is selected from the class consisting of oil seed meal, meat-bone meal, fish meal, single cell protein, and mixtures thereof.

3. The method of claim 1 in which said zinc salt provides from 0.01 to 0.02 parts by weight of zinc per part of protein in said admixture.

4. The method of providing cattle with proteinaceous feed materials to increase meat or milk production in relation to protein intake, comprising dry blending particulate proteinaceous cattle feed material with a ruminant-edible water-soluble zinc salt powder selected from the group consisting of zinc chloride, zinc sulfate, and zinc acetate, to form an admixture in which the particles of feed material are unreacted with said zinc salt powder, an amount of from 0.01 to 0.02 parts by weight of zinc being incorporated in said admixture per part of protein, and feeding said admixture without pelleting to beef cattle for meat production or dairy cattle for milk production, said zinc salt remaining unreacted with the protein of said feed material prior to said feeding.

5. The method of claims 1 or 4 in which said proteinaceous feed material consists essentially of oil seed meal.

6. The method of claims 1 or 4 in which said cattle are dairy cattle.

7. The method of claims 1 or 4 in which said cattle are beef cattle.

* * * * *